(12) United States Patent
Rosario

(10) Patent No.: US 10,845,065 B1
(45) Date of Patent: Nov. 24, 2020

(54) AIR FAN WITH ICE COMPARTMENT

(71) Applicant: Gabriel Rosario, Brooklyn, NY (US)

(72) Inventor: Gabriel Rosario, Brooklyn, NY (US)

( * ) Notice: Subject to any disclaimer, the term of this patent is extended or adjusted under 35 U.S.C. 154(b) by 133 days.

(21) Appl. No.: 16/215,818

(22) Filed: Dec. 11, 2018

(51) Int. Cl.
| | | |
|---|---|---|
| *F24F 1/02* | (2019.01) | |
| *F24F 5/00* | (2006.01) | |
| *F04D 29/58* | (2006.01) | |
| *F04D 29/40* | (2006.01) | |
| *F04D 29/70* | (2006.01) | |
| *F04D 1/02* | (2006.01) | |
| *F04D 29/60* | (2006.01) | |
| *F04D 25/08* | (2006.01) | |

(52) U.S. Cl.
CPC ............. *F24F 1/02* (2013.01); *F04D 1/025* (2013.01); *F04D 25/08* (2013.01); *F04D 29/403* (2013.01); *F04D 29/5826* (2013.01); *F04D 29/601* (2013.01); *F04D 29/703* (2013.01); *F24F 5/0021* (2013.01)

(58) Field of Classification Search
CPC .......... F24F 1/02; F24F 5/0021; F24F 5/0017; F25D 3/02; F25D 3/04; F25D 3/045; F25D 3/06; F25D 3/08; F25D 11/006
See application file for complete search history.

(56) References Cited

U.S. PATENT DOCUMENTS

| | | | | |
|---|---|---|---|---|
| 2,640,646 A | * | 6/1953 | Jones ................... | F04D 29/526 415/211.2 |
| 2,841,964 A | | 7/1958 | Anderson | |
| 3,421,687 A | * | 1/1969 | Daily ................... | F04D 29/526 415/121.2 |
| 3,799,255 A | * | 3/1974 | Luderssen ............. | F24F 1/02 165/122 |
| 5,078,574 A | * | 1/1992 | Olsen ................... | F04D 19/002 415/182.1 |
| 5,117,651 A | * | 6/1992 | Suh ...................... | F24F 1/0358 62/288 |
| 5,133,042 A | * | 7/1992 | Pelonis ................ | F24F 1/02 261/DIG. 65 |
| 5,197,301 A | | 3/1993 | Holcomb | |
| 5,737,938 A | * | 4/1998 | Liu ...................... | F24F 1/04 62/425 |
| 5,953,933 A | * | 9/1999 | Cheng .................. | F24F 5/0017 62/420 |
| 6,192,702 B1 | * | 2/2001 | Shimogori ............ | F24F 1/04 62/259.3 |
| 6,357,251 B1 | * | 3/2002 | Marks ................... | F24F 5/0017 62/425 |

(Continued)

FOREIGN PATENT DOCUMENTS

WO    9208879    5/1992

*Primary Examiner* — Nelson J Nieves

(57) ABSTRACT

The air fan with ice compartment is a thermal transfer device. The air fan with ice compartment is an enclosed structure that forces an air flow over a thermally treated mass, such as ice pack, and discharges the processed air flow into the atmosphere. The air fan with ice compartment comprises a base, a fan assembly, a fan control, an over chamber, and a lid. The fan assembly mounts on the base. The over chamber mounts over the fan assembly and the base. The lid and the fan control mount on the over chamber. The fan control controls the operation of the fan assembly. The fan assembly forces the air flow through the space enclosed by the over chamber and the base.

15 Claims, 6 Drawing Sheets

(56) References Cited

U.S. PATENT DOCUMENTS

| | | | | |
|---|---|---|---|---|
| 7,127,910 B2* | 10/2006 | Urfig | ................... | F24F 5/0017 62/422 |
| 7,305,848 B2 | 12/2007 | Glover | | |
| 7,381,129 B2* | 6/2008 | Avedon | ................ | F04D 25/088 454/230 |
| 7,748,235 B1 | 7/2010 | Franklin | | |
| D698,916 S | 2/2014 | Avedon | | |
| 8,894,478 B1* | 11/2014 | Stillwagon | ............ | F24F 3/1603 454/249 |
| 10,436,464 B1* | 10/2019 | Headrick | .............. | A01M 29/14 |
| 10,667,636 B1* | 6/2020 | Byrd | ............... | A47G 19/2288 |
| 2006/0070396 A1* | 4/2006 | Glover | ................ | F24F 5/0017 62/420 |
| 2009/0120925 A1* | 5/2009 | Lasko | ................... | F24H 3/0411 219/386 |
| 2013/0216213 A1* | 8/2013 | Thomas | .................. | F24F 7/007 392/465 |
| 2014/0290301 A1* | 10/2014 | Law | ........................ | F25D 17/04 62/404 |
| 2015/0211805 A1* | 7/2015 | Kuo | ........................ | F28D 15/00 165/110 |
| 2015/0374046 A1* | 12/2015 | Peavy | ................... | F24F 5/0017 62/406 |
| 2016/0039269 A1* | 2/2016 | Kumar | ...................... | F24F 1/04 62/77 |
| 2016/0097551 A1* | 4/2016 | Johnson | ................ | F24F 5/0021 62/411 |
| 2017/0370600 A1* | 12/2017 | Duncan | ................... | F24F 5/0017 |
| 2018/0087821 A1* | 3/2018 | McGirl | .................... | F24F 7/065 |
| 2018/0163980 A1* | 6/2018 | Lee | ........................ | F24F 5/0021 |
| 2019/0093909 A1* | 3/2019 | Floyd | .................... | A45C 13/02 |
| 2019/0247531 A1* | 8/2019 | Hsiao | ........................ | B01F 3/04 |

* cited by examiner

AIR FAN WITH ICE COMPARTMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and heating including refrigeration and cooling, more specifically, an arrangement for circulating cooling fluids using forced circulation. (F25D17/06)

SUMMARY OF INVENTION

The air fan with ice compartment is a thermal transfer device. The air fan with ice compartment is an enclosed structure that forces an air flow over a thermally treated mass, such as ice pack, and discharges the processed air flow into the atmosphere. The air fan with ice compartment comprises a base, a fan assembly, a fan control, an over chamber, and a lid. The fan assembly mounts on the base. The over chamber mounts over the fan assembly and the base. The lid and the fan control mount on the over chamber. The fan control controls the operation of the fan assembly. The fan assembly forces the air flow through the space enclosed by the over chamber and the base.

These together with additional objects, features and advantages of the air fan with ice compartment will be readily apparent to those of ordinary skill in the art upon reading the following detailed description of the presently preferred, but nonetheless illustrative, embodiments when taken in conjunction with the accompanying drawings.

In this respect, before explaining the current embodiments of the air fan with ice compartment in detail, it is to be understood that the air fan with ice compartment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the air fan with ice compartment.

It is therefore important that the claims be regarded as including such equivalent construction insofar as they do not depart from the spirit and scope of the air fan with ice compartment. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
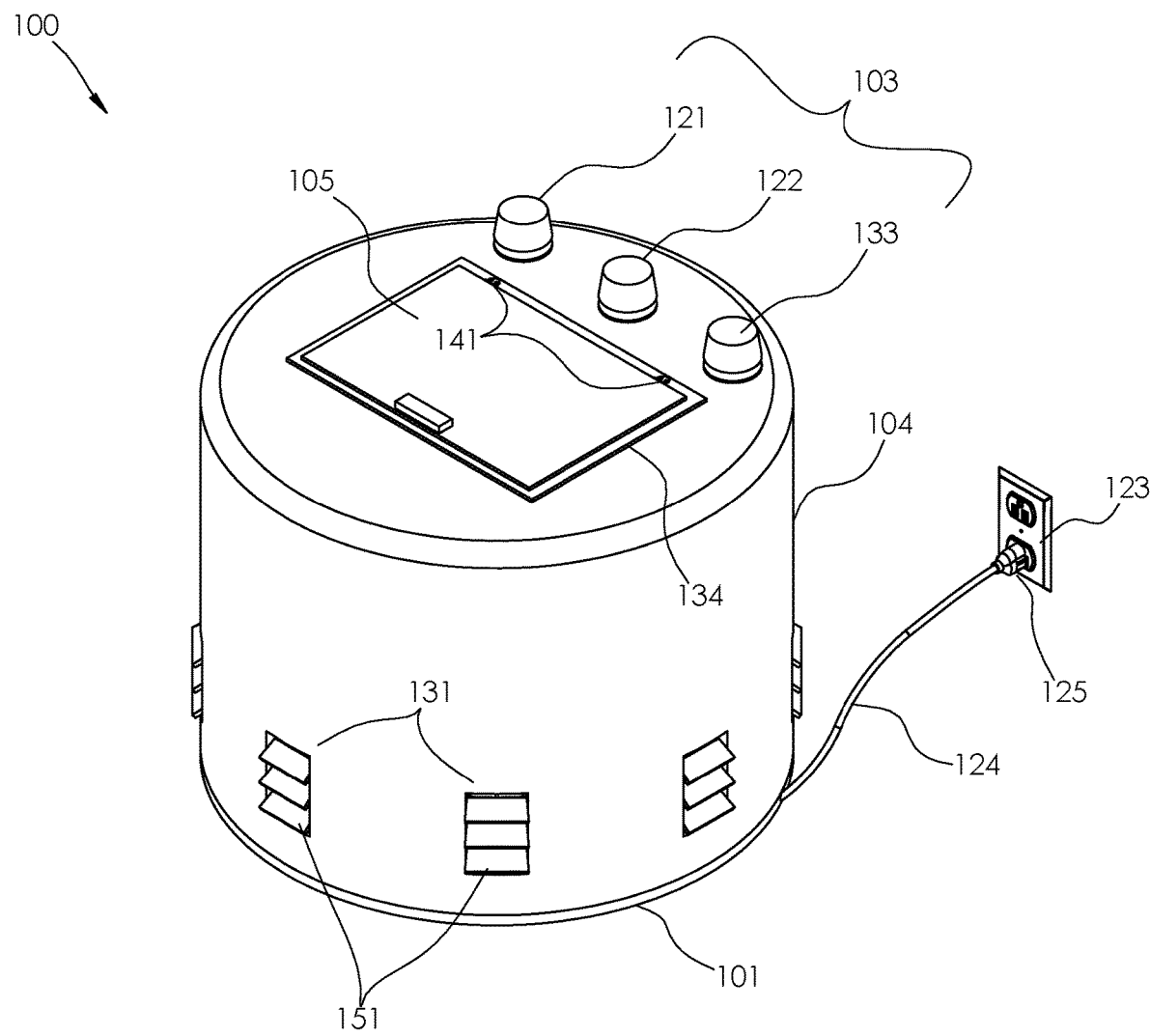
FIG. 1 is a perspective view of an embodiment of the disclosure.
Figure 2:
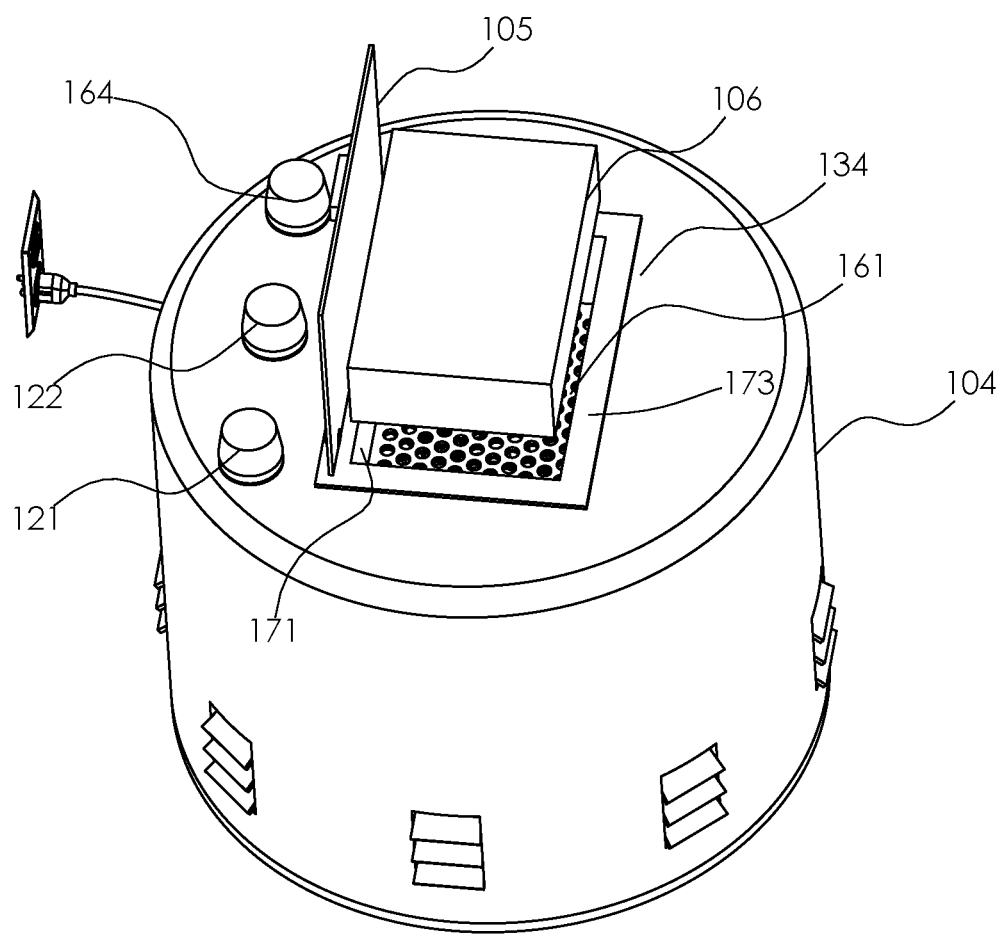
FIG. 2 is a perspective view of an embodiment of the disclosure.
Figure 3:
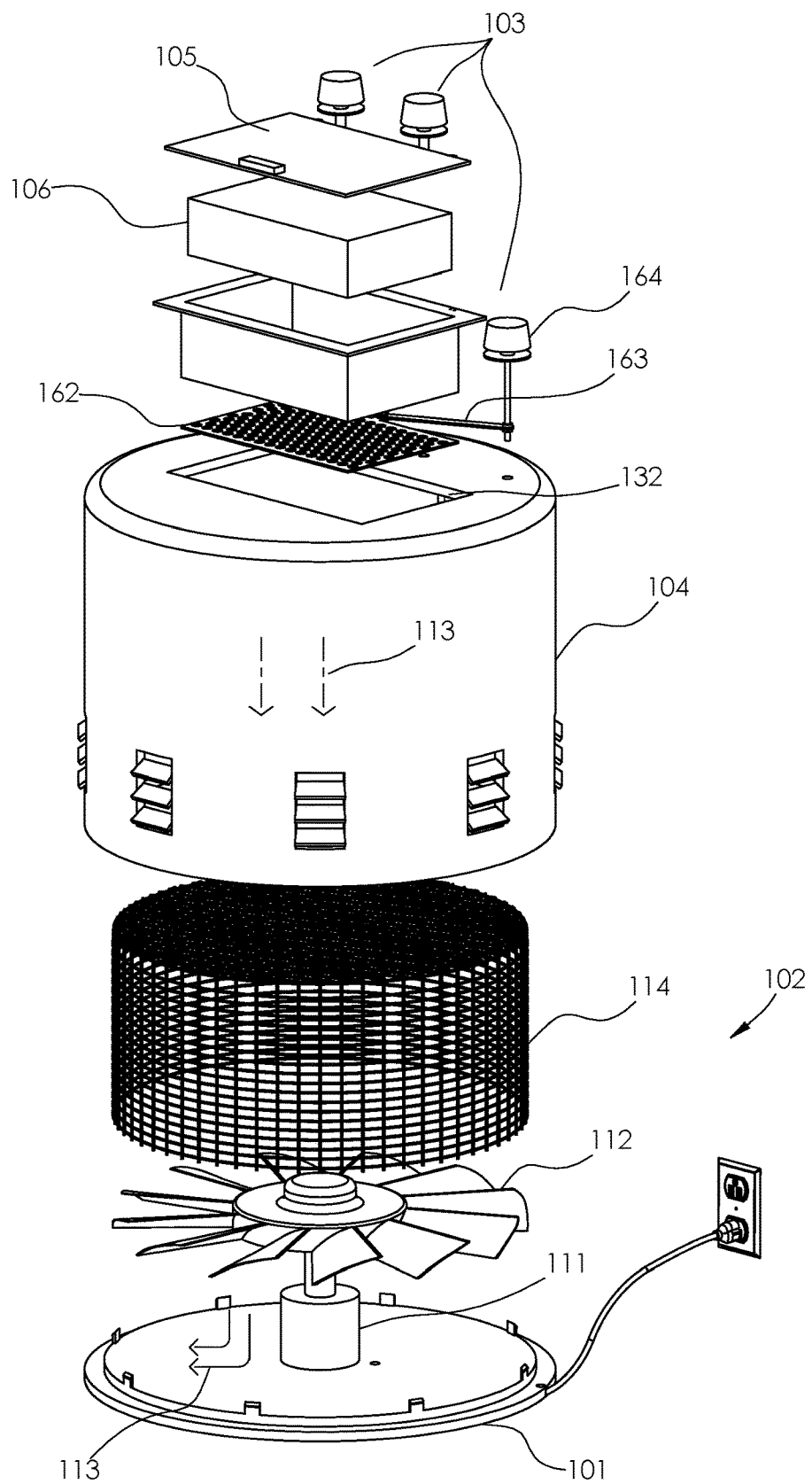
FIG. 3 is an exploded view of an embodiment of the disclosure.
Figure 4:
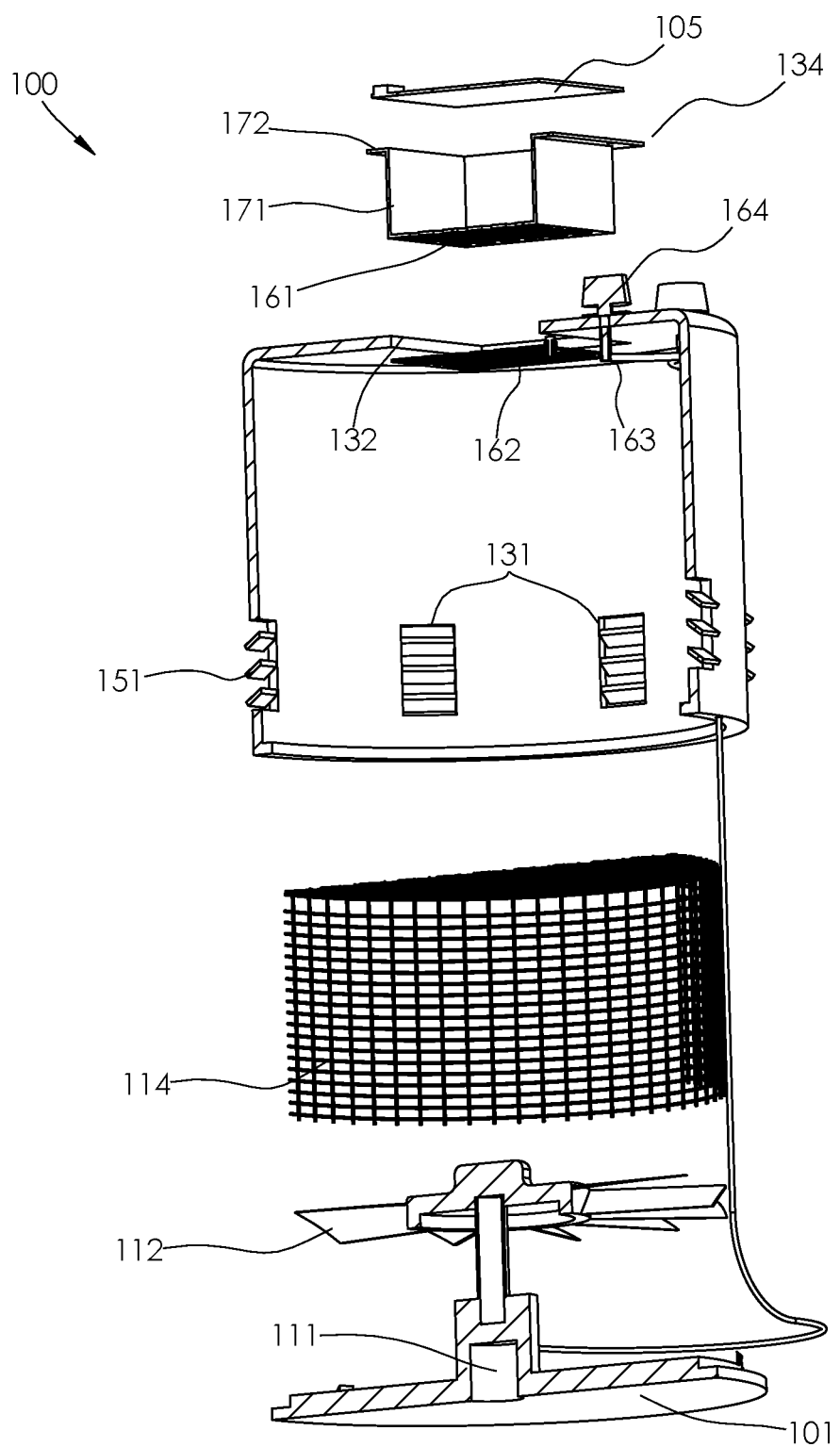
FIG. 4 is a detail view of an embodiment of the disclosure.
Figure 5:
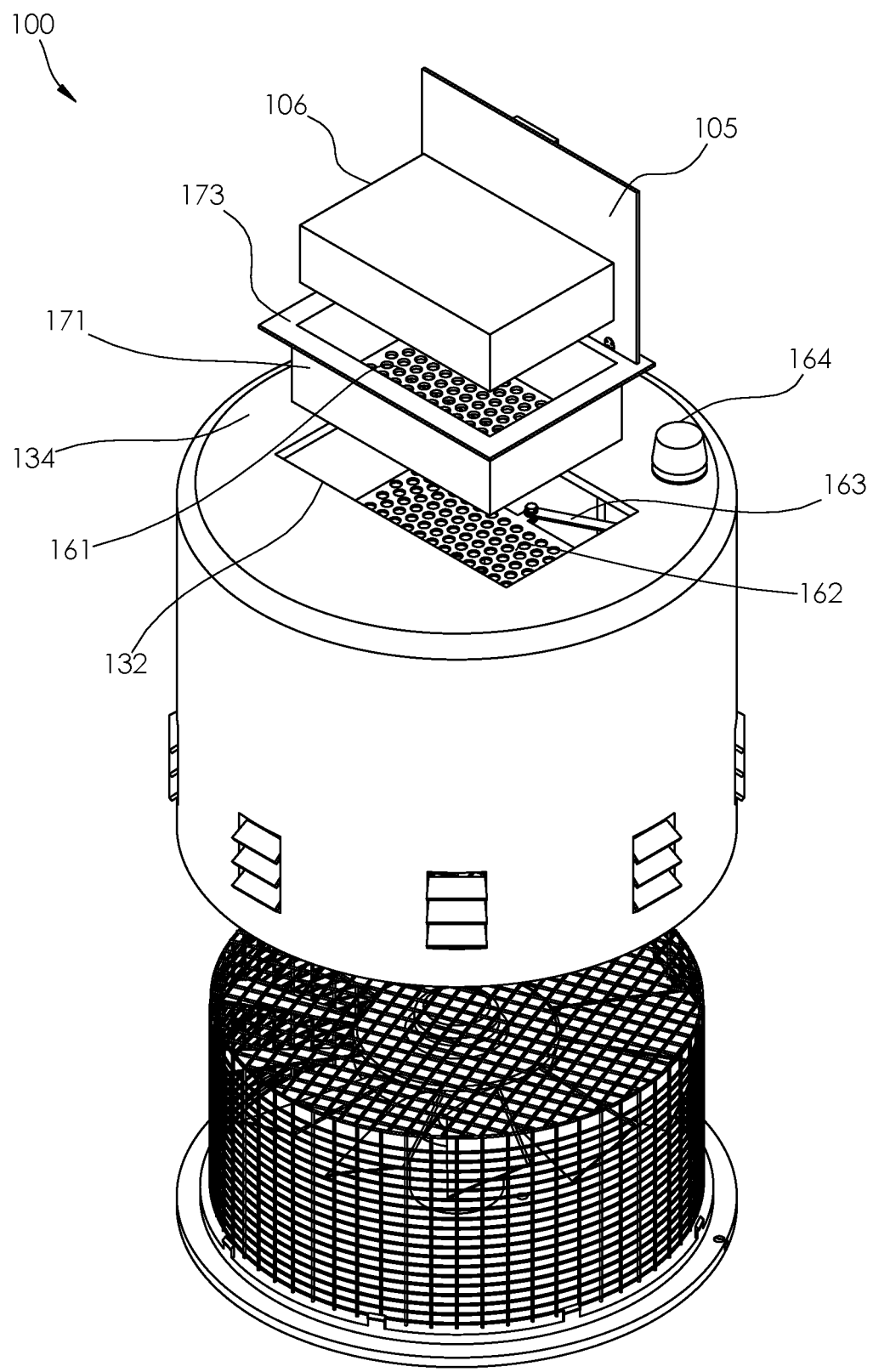
FIG. 5 is a detail view of an embodiment of the disclosure.
Figure 6:
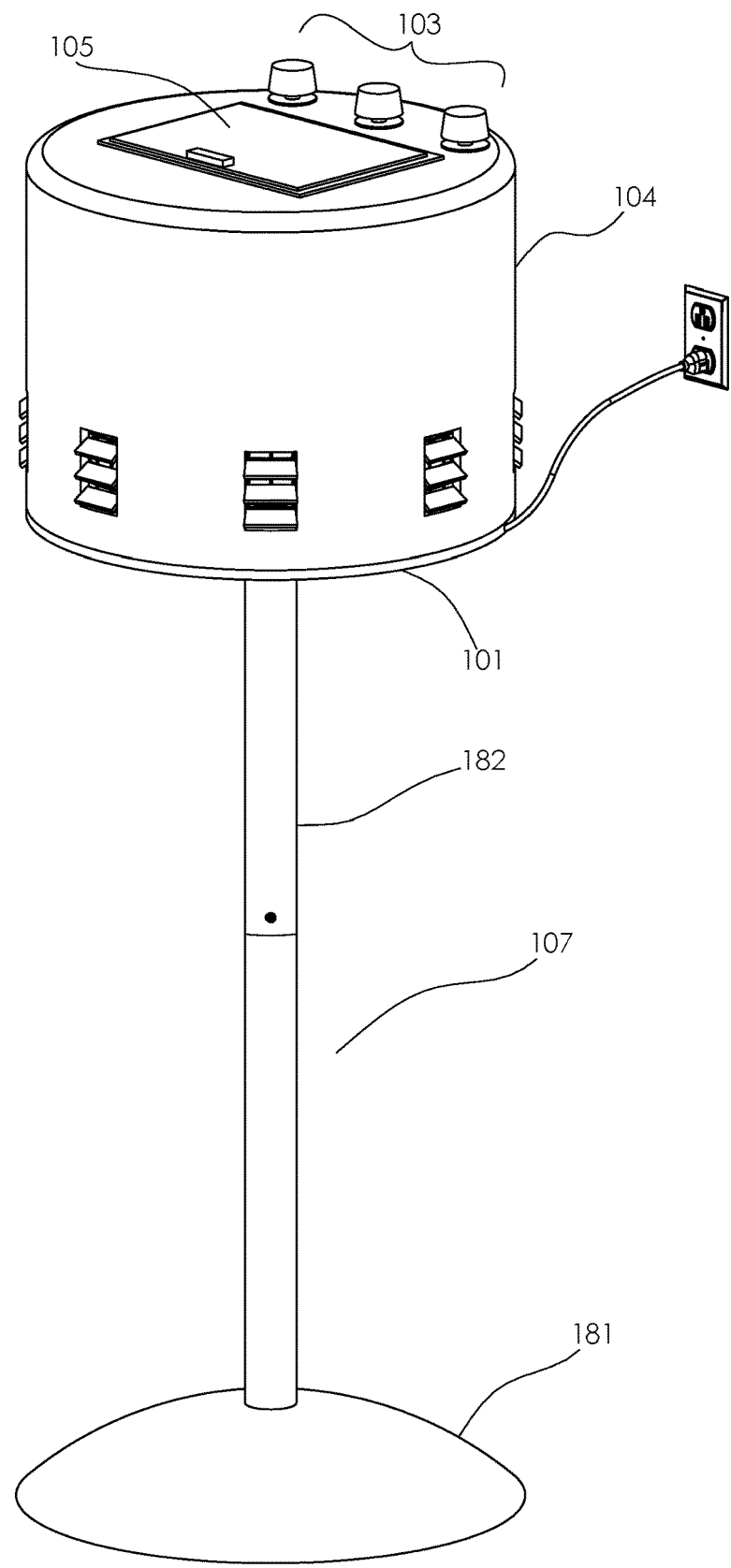
FIG. 6 is an in-use view of an embodiment of the disclosure.

Detailed reference will now be made to one or more potential embodiments of the disclosure, which are illustrated in FIGS. 1 through 6.

The air fan with ice compartment is a thermal transfer device. The invention 100 is an enclosed structure that forces an air flow 113 over a thermally treated mass, such as ice pack, and discharges the processed air flow 113 into the atmosphere. The invention 100 comprises a base 101, a fan assembly 102, a fan control 103, an over chamber 104, and a lid 105. The fan assembly 102 mounts on the base 101. The over chamber 104 mounts over the fan assembly 102 and the base 101. The lid 105 and the fan control 103 mount on the over chamber 104. The fan control 103 controls the operation of the fan assembly 102. The fan assembly 102 forces the air flow 113 through the space enclosed by the over chamber 104 and the base 101.

The base 101 is a disk structure. The base 101 encloses an open face of the over chamber 104.

The fan assembly 102 is a mechanical structure. The fan assembly 102 generates the air flow 113 through the over chamber 104. The fan assembly 102: a) draws atmospheric gases into the over chamber 104 to create an air flow 113; b) passes the air flow 113 over the thermal pack 106 to change the temperature of the air flow 113; and, c) discharges the processed air flow 113 back into the atmosphere. The fan assembly 102 comprises a motor 111, a blade 112, and a grille 114.

The motor 111 is an electric motor. The motor 111 attaches to the interior surface of the base 101. The motor 111 attaches to the blade 112 such that the motor 111 rotates the blade 112 to generate the air flow 113. The blade 112 is a mechanical structure. The blade 112 is a rotating structure. The design of the blade 112 is such that the rotation of the blade 112 by the motor 111 generates the air flow 113 through the over chamber 104. The grille 114 is an openwork structure. The grille 114 encloses the motor 111 and the blade 112. The grille 114 allows the air flow 113 to flow freely into and out of the blade 112. The grille 114 prevents solid objects from hitting the blade 112. The grille 114 forms a protective screen around the blade 112.

The air flow 113 refers to a continuous flow of atmospheric gases through the over chamber 104. The air flow 113 is generated by the operation of the motor 111 and the blade 112. The air flow 113 passes through the over chamber 104 such that a processed air flow 113 is discharged from the over chamber 104.

The fan control 103 is a device that controls: a) the operation of the fan assembly 102; and, b) the volume of gas contained in the air flow 113 that passes through the over chamber 104. The fan control 103 comprises a master switch 121, a speed selection switch 122, and an external power source 123.

The master switch 121 is an electrical device. The master switch 121 is a maintained switch. The master switch 121 is a single pole single throw switch. The master switch 121 controls the flow of electricity drawn from the external power source 123 into the motor 111. The master switch 121 is essentially the power switch of the invention 100.

The speed selection switch 122 is a maintained switch. The speed selection switch 122 is a single pole multiple throw switch. The speed selection switch 122 provides control signals to the motor 111. The speed selection switch 122 is used to control the speed of the motor 111. The use of a single pole multiple throw switch is well-known and documented in the electrical arts.

The external power source 123 is an externally provided source of electrical power. The external power source 123 powers the operation of the motor 111. This disclosure assumes that the external power source 123 is a national electric grid. The external power source 123 further comprises a cable 124 and a NEMA 5-15 plug 125.

The cable 124 is a conductive structure that transports electricity from the NEMA 5-15 plug 125 to the master switch 121. The NEMA 5-15 plug 125 is a standardized electrical connection. The NEMA 5-15 plug 125 forms an electrical connection between the national electric grid and the cable 124.

The over chamber 104 is a hollow prism-shaped structure. The over chamber 104 is formed as a pan. The over chamber 104 forms the exterior shell of the invention 100. The over chamber 104 forms the flow path that routes the air flow 113 during processing and then releases the air flow 113 into the atmosphere. The over chamber 104 is a casing. The over chamber 104 contains the fan assembly 102 and the fan control 103. The over chamber 104 routes the air flow 113 through the invention 100. The over chamber 104 is formed with all apertures and form factors necessary to allow the over chamber 104 to accommodate the use and operation of the invention 100. Methods to form an over chamber 104 suitable for the purposes described in this disclosure are well-known and documented in the mechanical arts.

The over chamber 104 comprises a plurality of vents 131, a blank 132, a throttle mechanism 133, and a tray 134.

Each of the plurality of vents 131 is a vent that is formed in the lateral face of the pan structure of the over chamber 104. Each of the plurality of vents 131 forms a port that discharges the processed air flow 113 back into the atmosphere. The plurality of vents 131 further comprises a plurality of louvers 151.

Each of the plurality of louvers 151 is a mechanical device that attaches to a vent selected from the plurality of vents 131. There is a one to one correspondence between the plurality of louvers 151 and the plurality of vents 131. Each louver selected from the plurality of louvers 151 opens and closes independently such that the flow of air through the associated vent is controlled by the selected louver.

The blank 132 is an aperture that is formed through the closed congruent face of the over chamber 104. The atmospheric gases that make up the air flow 113 are drawn into the over chamber 104 through the blank 132.

The throttle mechanism 133 is a mechanical device installed in the blank 132. The throttle mechanism 133 mechanically controls the volume gas that makes up the air flow 113 through the over chamber 104. The throttle mechanism 133 is adjustable such that the volume of gas contained in the air flow 113 is adjustable. The throttle mechanism 133 further comprises a foraminous plate 161, a throttle mechanism 133 plate 162, a throttle mechanism 133 lever 163, and a throttle mechanism 133 knob 164.

The foraminous plate 161 is a disk structure. The foraminous plate 161 is a foraminous structure. The foraminous plate 161 forms the inferior surface of the pan structure of the tray 134. The foraminous plate 161 forms a supporting horizontal surface used to elevate the thermal pack 106 above the fan assembly 102. The apertures formed through the foraminous plate 161 allow the air flow 113 to pass from the tray 134 into the interior space of the over chamber 104.

The throttle mechanism 133 plate 162 is a disk-shaped plate that is positioned underneath the foraminous plate 161. The perimeter of the throttle mechanism 133 plate 162 is geometrically similar to the perimeter of the foraminous plate 161. The throttle mechanism 133 plate 162 attaches to the foraminous plate 161 such that the throttle mechanism 133 plate 162 rotates relative to the foraminous plate 161. The throttle mechanism 133 plate 162 forms a barrier structure that inhibits the passage of the air flow 113 through the foraminous plate 161. The position of the throttle mechanism 133 plate 162 relative to the foraminous plate 161 controls the volume of gas contained in the air flow 113 that passes through the over chamber 104.

The position of the throttle mechanism 133 plate 162 relative to the foraminous plate 161 is controlled using the throttle mechanism 133 lever 163 and the throttle mechanism 133 knob 164. The throttle mechanism 133 lever 163 is a mechanical linkage between the throttle mechanism 133 knob 164 and the position of the throttle mechanism 133 plate 162 relative to the foraminous plate 161. The throttle mechanism 133 lever 163 attaches to the throttle mechanism 133 knob 164 such that the rotation of the throttle mechanism 133 knob 164 rotates the throttle mechanism 133 plate 162 relative to the foraminous plate 161.

The tray 134 is a pan structure. The tray 134 installs in the blank 132. The footprint of the tray 134 is geometrically similar to the blank 132 such that the tray 134 inserts into the blank 132. The tray 134 further comprises a thermal pan 171 and a suspending ledge 173.

The thermal pan 171 is a prism-shaped structure. The thermal pan 171 is sized to contain the thermal pack 106. The thermal pan 171 has a superior open face and the inferior foraminous plate 161. The thermal pack 106 installs into the thermal pan 171 through the open superior face and is supported above the fan assembly 102 by the foraminous plate 161. The thermal pan 171 inserts into the blank 132 of the over chamber 104.

The suspending ledge 173 is a ledge that projects away from the perimeter of the superior open face of the thermal pan 171. The perimeter of the suspending ledge 173 is geometrically similar to the perimeter of the blank 132. The span of the length of the perimeter of the suspending ledge 173 is greater than the span of the length of the perimeter of the blank 132 such that the suspending ledge 173 suspends the thermal pan 171 above the fan assembly 102 from the blank 132.

The lid 105 is a disk structure. The lid 105 encloses the air intake of the over chamber 104 when the invention 100 is not in use. The lid 105 attaches to the over chamber 104 such that the lid 105 opens and closes the blank 132. The lid 105 attaches to the over chamber 104 such that the lid 105 rotates relative to the over chamber 104. The lid 105 further comprises a hinge 141. The hinge 141 comprises one or more hardware items. The hinge 141 attaches the lid 105 to the over chamber 104 such that the lid 105 opens and closes the blank 132 of the over chamber 104.

The thermal pack 106 is a structure that has a high thermal capacity. The thermal pack 106 is placed within the path of the air flow 113 such that energy is exchanged between the air flow 113 and the thermal pack 106 in a manner cools or heats the air flow 113 as desired.

The thermal pack 106 contains the working fluid. The working fluid is a heat exchange medium that is processed before use of the invention 100. The process is selected from the group consisting of cooling or heating. The processed working fluid acts as a thermal mass within the thermal pack 106 such that: 1) the thermal pack 106 changes the temperature of the air flow 113 through the over chamber 104 when the air flow 113 passes over the thermal pack 106.

In the first potential embodiment of the disclosure, the working fluid is a gel selected from the group consisting of 2-hydroxyethyl cellulose (CAS 9004-62-0) or silica gel (CAS 7631-86-9). The working fluid is prepared for use by: a) exposing the working fluid in the thermal pack 106 to infrared or microwave radiation; or, b) placing the thermal pack 106 in a refrigerated environment. The applicant prefers that the refrigerated environment be at or below a temperature of +5 F (—15 C).

The thermal pack 106 is further defined elsewhere in this disclosure.

The invention further comprises a stand 107. The stand 107 is an extension structure. The stand 107 elevates the structure formed by the base 101 and the over chamber 104 above the supporting surface. The base 101 attaches to the stand 107. The span of the length of the stand 107 is adjustable such that the elevation of the combined base 101 and the over chamber 104 is adjustable. The stand 107 forms a load path between the combined base 101 and over chamber 104 and the supporting surface. The stand 107 further comprises a pedestal 181 and a telescopic stanchion 182.

The telescopic stanchion 182 is a mechanical device that attaches the base 101 to the pedestal 181. The span of the length of the telescopic stanchion 182 is adjustable such that the elevation of the combined base 101 and the over chamber 104 is also adjustable. The telescopic stanchion 182 is a telescopic structure. Methods to form telescopic structures are well-known and documented in the mechanical arts. The pedestal 181 is a load-bearing structure. The pedestal 181 attaches to the telescopic stanchion 182 such that the pedestal 181 transfers the load of the invention 100 to a supporting surface.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure.

Blade: As used in this disclosure, a blade is a term that is used to describe a wide and flat structure or a portion of a larger structure such as a propeller.

Blank: As used in this disclosure, a blank is an object that presents one or more featureless surfaces.

Cable: As used in this disclosure, a cable is a collection of insulated wires covered by a protective casing that is used for transmitting electricity or telecommunication signals.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable negative space that is dedicated to a purpose.

Closed Position: As used in this disclosure, a closed position refers to a movable barrier structure that is in an orientation that prevents passage through a port or an aperture. The closed position is often referred to as an object being "closed." Always use orientation.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. Specifically, the sum of the surface areas of two ends of the prism-shaped object that forms the disk is greater than the surface area of the lateral face of the prism-shaped object that forms the disk. In this disclosure, the ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Apparatus: As used in this disclosure, an extension apparatus is a mechanical structure that is used to extend the span of the distance between any two objects or the reach of a first object towards a second object.

Fan: As used in this disclosure, a fan is a pump that moves a gas. The first potential embodiment of this disclosure assumes that the fan is a mechanical device with rotating blades that is used to create a flow or current of a gas.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Footprint: As used in this disclosure, a footprint is the surface area occupied by an object.

Foraminous: As used in this disclosure, foraminous is an adjective that describes a surface, plate, or platform that is perforated with a plurality of holes.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grille: As used in this disclosure, a grille is a cover for a vent of an HVAC system. The grille comprises a barrier formed of bars or wires that allow for the passage of air through the grille while preventing solid items from passing through the grille.

Hardware: As used in this disclosure, refers to one or more incidental objects: 1) that are readily and commercially available; and, 2) that are associated with the installation, operation or maintenance of a primary object. Always use incidental.

Hinge: As used in this disclosure, a hinge is a device that permits the turning, rotating, or pivoting of a first object relative to a second object.

Incidental: As used in this disclosure, incidental refers to a second object that is associated with a first object but that: 1) does not significantly affect the characteristics of the first object; and, 2) the function of which can be readily replaced by or substituted with a third object.

Ledge: As used in this disclosure, a ledge is a horizontal surface that projects away from a vertical surface. A ledge that projects away from, or overhangs, the vertical surface in the manner of a cantilever is referred to as an undercut ledge.

Lever: As used in this disclosure, a lever is a simple machine that comprises a shaft that rotates around a fulcrum or pivot point.

Louver: As used in this disclosure, a louver is a (generally rectangular) plate that is installed in a vent for the purpose of directing air flow.

Maintained Switch: A used in this disclosure, a maintained switch is a switch that maintains the position that was set in the most recent switch actuation. A maintained switch works in an opposite manner to a momentary switch.

Mechanical Linkage: As used in this disclosure, a mechanical linkage is an interconnected arrangement of components that are used to manage the transfer of a movement or a force. A mechanical linkage is often referred to as a linkage.

Motor: As used in this disclosure, a motor refers to the method of transferring energy from an external power source into rotational mechanical energy.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter.

NEMA: As used in this disclosure, NEMA is an acronym for National Electric Manufacturers Association. NEMA is a manufacturer's association known for publishing widely accepted technical standards regarding the performance of electrical power distribution equipment.

NEMA 5-15P Electrical Plug: As used in this disclosure, the NEMA 5-15P Electrical Plug is a plug that is designed to be inserted into a NEMA 5-15 Electrical Socket for the purpose of delivering electrical power to electrical devices. The NEMA 5-15P Electrical Plug is a 3 blade plug that is commonly found within residential and office environments within the United States.

Normalization: As used in this disclosure, normalization refers to a procedure wherein the measurement scale of each of two or more data sets are mathematically adjusted to make the two or more data sets directly comparable.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Openwork: As used in this disclosure, the term open work is used to describe a structure, often a surface, which is formed with openings that allow for visibility and fluid flow through the structure. Wrought work and meshes are forms of openwork.

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan.

Pedestal: As used in this disclosure, a pedestal is an intermediary load bearing structure that that transfers a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: a) is of uniform thickness; and b) that appears thin relative to the other dimensions of the object. Plates are often disks. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder Shell: As used in this disclosure, a shell is a structure that forms an outer covering intended to contain an object. Shells are often, but not necessarily, rigid or semi-rigid structures that are intended to protect the object contained within it.

Stanchion: As used in this disclosure, a stanchion refers to a vertical pole, post, or support.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Telescopic: As used in this disclosure, telescopic is an adjective that describes an object made of sections that fit or slide into each other such that the object can be made longer or shorter by adjusting the relative positions of the sections.

Thermal Capacity: As used in this disclosure, the thermal capacity of a material is a measure of the energy required to be added to the material to raise the temperature of the material by a previously specified amount. The heat capacity of a material, also known as the specific heat, refers to the thermal capacity after normalization for potential differences in mass.

Thermal Pack: As used in this disclosure, a thermal pack is an enclosed bag that contains a mass of material that has a high thermal capacity. The thermal pack is commonly used to rapidly warm and cool objects. A thermal pack used strictly for cooling is referred to as an ice pack. A thermal pack used strictly for heating is a hot pack.

Throttle: As used in this disclosure, a throttle is a generic term for a device that controls the volume of flow into a structure.

Tray: As used in this disclosure, a tray is a disk-shaped pan structure.

Vent: As used in this disclosure, a vent is an opening in a structure that allows for the flow of gas through the boundary of the structure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. An air circulation device comprising:
a base, a fan assembly, a fan control, an over chamber, and a lid;
wherein the fan assembly mounts on the base;

wherein the over chamber mounts over the fan assembly and the base;
wherein the lid and the fan control mount on the over chamber;
wherein the fan control controls an operation of the fan assembly;
wherein the air circulation device further comprises a stand;
wherein the stand elevates the base and the over chamber;
wherein the air circulation device is an enclosed structure;
wherein the air circulation device forces an air flow over a thermal pack;
wherein the fan assembly forces the air flow through a space enclosed by the over chamber and the base;
wherein the base is a disk structure;
wherein the fan assembly is a mechanical structure;
wherein the fan assembly generates the air flow through the over chamber;
wherein the fan assembly draws atmospheric gases into the over chamber to create the air flow;
wherein the fan assembly passes the air flow over the thermal pack to change the temperature of the air flow;
wherein the fan assembly discharges the processed air flow back into the atmosphere;
wherein the fan control is a device that controls the operation of the fan assembly;
wherein the fan control is a device that controls a volume of gas contained in the air flow that passes through the over chamber;
wherein the over chamber is a hollow prism-shaped structure;
wherein the over chamber is formed as a pan;
wherein the over chamber forms the exterior shell of the air circulation device;
wherein the over chamber the air flow during processing and then releases the air flow into the atmosphere;
wherein the over chamber is a casing;
wherein the over chamber contains the fan assembly and the fan control.

2. The air circulation device according to claim 1
wherein the lid is a disk structure;
wherein the lid encloses an air intake of the over chamber when the air circulation device is not in use;
wherein the lid attaches to the over chamber such that the lid opens and closes a blank;
wherein the lid attaches to the over chamber such that the lid rotates relative to the over chamber;
wherein the lid further comprises a hinge;
wherein the hinge comprises one or more hardware items;
wherein the hinge attaches the lid to the over chamber such that the lid opens and closes the blank of the over chamber.

3. The air circulation device according to claim 2
wherein the thermal pack is a structure that has a high thermal capacity;
wherein the thermal pack is placed within a path of the air flow such that energy is exchanged between the air flow and the thermal pack to process the air flow.

4. The air circulation device according to claim 3
wherein the air circulation device further comprises the stand;
wherein the stand is an extension structure;
wherein the stand elevates the structure formed by the base and the over chamber above the supporting surface;
wherein a span of a length of the stand is adjustable such that an elevation of the combined base and the over chamber is adjustable.

5. The air circulation device according to claim 4
wherein the fan assembly comprises a motor, a blade, and a grille;
wherein the motor attaches to the blade;
wherein the grille encloses the motor and the blade.

6. The air circulation device according to claim 5
wherein the motor is an electric motor;
wherein the blade is a mechanical structure;
wherein the grille is an openwork structure;
wherein the blade is a rotating structure;
wherein the motor attaches to the base;
wherein the motor attaches to the blade such that the motor rotates the blade to generate the air flow.

7. The air circulation device according to claim 6
wherein the fan control comprises a master switch, a speed selection switch, and an external power source;
wherein the master switch and the external power source are electrically interconnected;
wherein the master switch, the speed selection switch and the motor are electrically interconnected.

8. The air circulation device according to claim 7
wherein the master switch is an electrical device;
wherein the master switch is a maintained switch;
wherein the master switch is a single pole single throw switch;
wherein the speed selection switch is a maintained switch;
wherein the speed selection switch is a single pole multiple throw switch;
wherein the speed selection switch provides control signals to the motor;
wherein the speed selection switch controls the speed of the motor.

9. The air circulation device according to claim 8
wherein the external power source is an externally provided source of electrical power;
wherein the external power source powers the operation of the motor;
wherein the external power source further comprises a cable and a plug;
wherein the cable is a conductive structure that transports electricity from the plug to the master switch;
wherein the plug forms an electrical connection between the external power source and the cable.

10. The air circulation device according to claim 9
wherein the over chamber comprises a plurality of vents, a blank, a throttle mechanism, and a tray;
wherein the plurality of vents, the blank, the throttle mechanism, and the tray install in the over chamber.

11. The air circulation device according to claim 10
wherein each of the plurality of vents is formed in the lateral face of the pan structure of the over chamber;
wherein each of the plurality of vents is a port that discharges the processed air flow into the atmosphere;
wherein the plurality of vents further comprises a plurality of louvers;
wherein each of the plurality of louvers is a mechanical device that attaches to a vent selected from the plurality of vents;
wherein there is a one to one correspondence between the plurality of louvers and the plurality of vents;
wherein each louver selected from the plurality of louvers opens and closes independently.

12. The air circulation device according to claim 11
wherein the blank is an aperture that is formed through the closed congruent face of the over chamber;
wherein the atmospheric gases that make up the air flow are drawn into the over chamber through the blank;
wherein the throttle mechanism is a mechanical device installed in the blank;
wherein the throttle mechanism mechanically controls the volume gas that makes up the air flow through the over chamber;
wherein the throttle mechanism is adjustable such that the volume of gas contained in the air flow is adjustable;
wherein the tray is a pan structure;
wherein the tray installs in the blank;
wherein the footprint of the tray is geometrically similar to the blank such that the tray inserts into the blank.

13. The air circulation device according to claim 12
wherein the throttle mechanism further comprises a foraminous plate, a throttle mechanism plate, a throttle mechanism lever, and a throttle mechanism knob;
wherein the foraminous plate, the throttle mechanism plate, the throttle mechanism lever, and the throttle mechanism knob form a mechanical linkage;
wherein the foraminous plate attaches to the tray.

14. The air circulation device according to claim 13
wherein the tray further comprises a thermal pan and a suspending ledge;
wherein the thermal pan is a prism-shaped structure;
wherein the thermal pan is sized to contain the thermal pack;
wherein the thermal pan inserts into the blank of the over chamber;
wherein the suspending ledge is a ledge that projects away from the perimeter of the of the thermal pan;
wherein the perimeter of the suspending ledge is geometrically similar to the perimeter of the blank;
wherein the span of the length of the perimeter of the suspending ledge is greater than the span of the length of the perimeter of the blank such that the suspending ledge suspends the thermal pan above the fan assembly from the blank.

15. The air circulation device according to claim 14
wherein the foraminous plate is a disk structure;
wherein the foraminous plate is a foraminous structure;
wherein the foraminous plate forms the inferior surface of the pan structure of the tray;
wherein the foraminous plate forms a supporting horizontal surface that elevates the thermal pack above the fan assembly;
wherein the throttle mechanism plate is a disk-shaped plate that is positioned underneath the foraminous plate;
wherein the perimeter of the throttle mechanism plate is geometrically similar to the perimeter of the foraminous plate;
wherein the throttle mechanism plate attaches to the foraminous plate such that the throttle mechanism plate rotates relative to the foraminous plate;
wherein the throttle mechanism plate forms a barrier structure that inhibits the passage of the air flow through the foraminous plate;
wherein the position of the throttle mechanism plate relative to the foraminous plate is controlled using the throttle mechanism lever and the throttle mechanism knob.

* * * * *